United States Patent
Sato

(10) Patent No.: US 7,554,763 B2
(45) Date of Patent: Jun. 30, 2009

(54) MAGNETIC HEAD HAVING AN INSULATING LAYER COMPRISED OF AN ORGANIC LAYER ON AN INORGANIC LAYER

(75) Inventor: Kiyoshi Sato, Niigata-ken (JP)

(73) Assignee: TDK Corporation, Tokyo (JP)

( * ) Notice: Subject to any disclaimer, the term of this patent is extended or adjusted under 35 U.S.C. 154(b) by 296 days.

(21) Appl. No.: 10/984,650

(22) Filed: Nov. 9, 2004

(65) Prior Publication Data

US 2005/0105212 A1 May 19, 2005

(30) Foreign Application Priority Data

Nov. 14, 2003 (JP) ............................ 2003-384427

(51) Int. Cl.
*G11B 5/17* (2006.01)
(52) U.S. Cl. ............................ 360/123.09; 360/123.29; 360/123.5
(58) Field of Classification Search ................. 360/123, 360/124, 125, 126, 127, 128, 122, 123.11, 360/123.47, 123.09, 123.29, 123.5
See application file for complete search history.

(56) References Cited

U.S. PATENT DOCUMENTS

| 5,969,911 | A * | 10/1999 | Hikami et al. ............... 360/317 |
| 6,353,511 | B1 | 3/2002 | Shi et al. |
| 6,490,127 | B1 * | 12/2002 | Sasaki ........................ 360/126 |
| 7,047,625 | B2 * | 5/2006 | Han et al. ................. 29/603.16 |
| 7,130,153 | B2 * | 10/2006 | Shen et al. ............. 360/125.55 |

FOREIGN PATENT DOCUMENTS

| JP | 05-242429 | 9/1993 |
| JP | 2000-357307 | 12/2000 |
| JP | 2001-76320 | 3/2001 |
| JP | 2001-195707 | 7/2001 |
| JP | 2002-25009 | 1/2002 |

OTHER PUBLICATIONS

Office Action issued in corresponding Japanese Patent Application No. 2003-384427; issued Nov. 13, 2007.
Office Action issued in corresponding Japanese Patent Application No. 2003-384427; issued Aug. 19, 2008.

\* cited by examiner

*Primary Examiner*—A. J. Heinz
(74) *Attorney, Agent, or Firm*—Brinks Hofer Gilson & Lione

(57) ABSTRACT

A magnetic head includes a plurality of coil elements disposed in a space defined by a lower core layer, a pole layer, and a back gap layer. A coil insulator fills the space so as to cover the coil elements. The top face of the pole layer, the top face of the coil insulator, the top faces of the coil elements, and the top face of the back gap layer form a planarized plane. The coil elements are disposed on a recess formed on the lower core layer. The bottom faces of the coil elements are disposed at substantially the same height as the top face of the lower core layer. The top faces of the coil elements lie in the planarized plane.

5 Claims, 14 Drawing Sheets

MAGNETIC HEAD HAVING AN INSULATING LAYER COMPRISED OF AN ORGANIC LAYER ON AN INORGANIC LAYER

This application claims the benefit of priority to Japanese Patent Application No. 2003-384427 filed on Nov. 14, 2003, herein incorporated by reference.

BACKGROUND OF THE INVENTION

1. Field of the Invention

The present invention relates to a thin-film magnetic writing head used as, for example, a floating magnetic head. More particularly the present invention relates to a thin-film magnetic head which is provided with a thick coil to reduce the electrical resistance. Furthermore, the present invention relates to a method for manufacturing the magnetic head.

2. Description of the Related Art

Inductive writing heads of which coil layers are formed on lower core layers composed of magnetic materials are disclosed in Japanese Unexamined Patent Application Publication Nos. 2001-076320 and 2002-025009.

Recently, the recording density of such writing heads has been improved and the size of magnetic heads has been reduced. As a result, a reduction in size of a pole portion has been in demand.

To address the high recording density, a planar inductive magnetic head having a planarized upper core on a lower core is disclosed in U.S. Pat. No. 6,353,511.

The magnetic head disclosed in U.S. Pat. No. 6,353,511 exhibits an improved recording density compared with those disclosed in Japanese Unexamined Patent Application Publication Nos. 2001-076320 and 2002-025009. In such a magnetic head having a high recording density, the coil must be disposed in a very narrow space because of the reduced size of the magnetic head. Therefore, the coil itself must be small. In such a structure, the cross-sectional area of the coil becomes narrow and the resistance of the coil is increased.

When the resistance of the coil is increased, a recording current flowing in the coil generates a large amount of Joule heat and the temperature in the inductive head rises significantly.

The thermal expansion coefficient of a metal material which forms the coil or the core is different from that of an insulating material which covers the coil or the core. Therefore, when the temperature in the inductive head rises, the inductive head portion may protrude from an opposing face because of the difference in thermal expansion coefficients, that is to say, pole tip protrusion (PTP) occurs.

When the PTP occurs, the frequency of collision of the inductive head with the recording medium increases. As a result, the recording medium and the inductive head are easily damaged.

SUMMARY OF THE INVENTION

Accordingly, it is an object of the present invention to provide a thin-film magnetic head that includes a thick coil to reduce the electrical resistance. Furthermore, it is an object of the present invention to provide a method for fabricating the magnetic head.

A magnetic head according to the present invention includes a lower core layer extending from a face opposing a recording medium in the height direction; a pole layer provided on the lower core layer, the pole layer having a predetermined length in the height direction from the opposing face, the width of the pole layer at the opposing face in the width direction determining a track width Tw; a back gap layer disposed on the lower core layer at a position distant from the pole layer in the height direction; a first insulating layer a recess provided on the lower core layer between the pole layer and the back gap layer; a plurality of first coil elements provided on the first insulating layer in a space defined by the lower core layer, the pole layer, and the back gap layer; a coil insulator filling the space so as to cover the coil elements, the top face of the pole layer, the top face of the coil insulator, the top faces of the coil elements, and the top face of the back gap layer lying in a planarized plane; a second insulating layer on the coil elements; and a magnetic layer formed over the planarized plane, the back gap layer being in direct or indirect contact with the magnetic layer and with the lower core layer at the rear ends in the height direction.

The first insulating layer may be continuously disposed over a rear face of the pole layer in the height direction, the recess, and a front face of the back gap layer in the height direction.

The magnetic head may include a third insulating layer disposed on the magnetic layer and second coil elements provided on the third insulating layer. The first coil elements and the second coil elements are electrically connected with each other at the respective ends and form a toroidal coil that is wound around the magnetic layer.

Preferably, the third insulating layer is composed of an inorganic insulating sublayer and an organic insulating sublayer laminated on the inorganic insulating sublayer.

The coil elements provided in the space defined by the lower core layer, the pole layer, and the back gap layer may helically surround the back gap layer.

The present invention provides a method for fabricating a magnetic head, wherein the magnetic head includes a lower core layer extending from a face opposing a recording medium in the height direction; a pole layer provided on the lower core layer, the pole layer having a predetermined length in the height direction from the opposing face; and a back gap layer disposed on the lower core layer at a position distant from the pole layer in the height direction, the lower core layer, the pole layer, and the back gap layer define a space. The method includes the steps of:

(a) forming a recess on the lower core layer in the space and providing a first insulating layer on the recess;

(b) forming a plurality of first coil elements on the first insulating layer;

(c) covering the coil elements with a coil insulator and forming a planarized plane by polishing the top face of the pole layer, the top face of the coil insulator, and the top face of the back gap layer; and (d) forming a second insulating layer to cover the coil elements on the planarized plane and forming a magnetic layer on the second insulating layer.

The method for fabricating the magnetic head may further include a step, before said step (a), of forming the pole layer and the back gap layer on the lower core layer, wherein the first insulating layer provided in said step (a) is continuously formed over a rear face of the pole layer in the height direction, the recess, and a front face of the back gap layer in the height direction.

The method for fabricating the magnetic head may further include a step, after said step (d), of forming a third insulating layer on the magnetic layer and forming second coil elements on the third insulating layer, wherein the first coil elements and the second coil elements are electrically connected with each other at the respective ends and form a toroidal coil that is wound around the magnetic layer.

In the method for fabricating the magnetic head, the third insulating layer is preferably formed by depositing an inorganic insulating sublayer and an organic insulating sublayer on the inorganic insulating sublayer.

In the method for fabricating the magnetic head, the first coil elements formed on the first insulating layer in said step (b) may extend outside the space and helically surround the back gap layer.

In the magnetic head according to the present invention, the recess is formed on the lower core layer. The coil-insulating base layer (first insulating layer) is formed on the recess and then the coil elements are formed on the coil-insulating base layer. Therefore, the bottom faces of the coil elements and the top face of the lower core layer can be disposed at substantially the same height. The top faces of the coil elements extend to the planarized plane A1. Therefore, the thickness of the coil elements can be increased.

Although downsizing of an inductive head because of recent improvement in recording density requires a reduced space for forming the coil elements, the cross-sectional area of the coil elements can be increased. As a result, the direct-current resistance of the coil elements is reduced. Therefore, in the magnetic head according to the present invention, Joule heat generated by the recording current flowing in the coil elements decreases and an increase in temperature inside the magnetic head can be inhibited.

The thermal expansion coefficient of a metal material which forms the coil elements, the lower core layer, and the upper core layer (magnetic layer) is different from that of an insulating material which covers the coil elements and the core layers. Therefore, when the temperature inside the magnetic head rises, the magnetic head portion may protrude from an opposing face because of the difference in thermal expansion coefficients, that is to say, pole tip protrusion (PTP) occurs.

When PTP occurs, the frequency of collision of the inductive head with the recording medium increases. As a result, the recording medium and the inductive head are easily damaged.

In the magnetic head according to the present invention, since the cross-sectional area of the coil elements can be increased, the direct-current resistance of the coil elements can be reduced and Joule heat generated by the recording current flowing in the coil elements can be decreased. As a result, the PTP is effectively inhibited. Therefore, the frequency of collision of the magnetic head with the recording medium decreases and damage to the recording medium and the magnetic head can be prevented.

DESCRIPTION OF THE PREFERRED EMBODIMENTS

Figure 1:
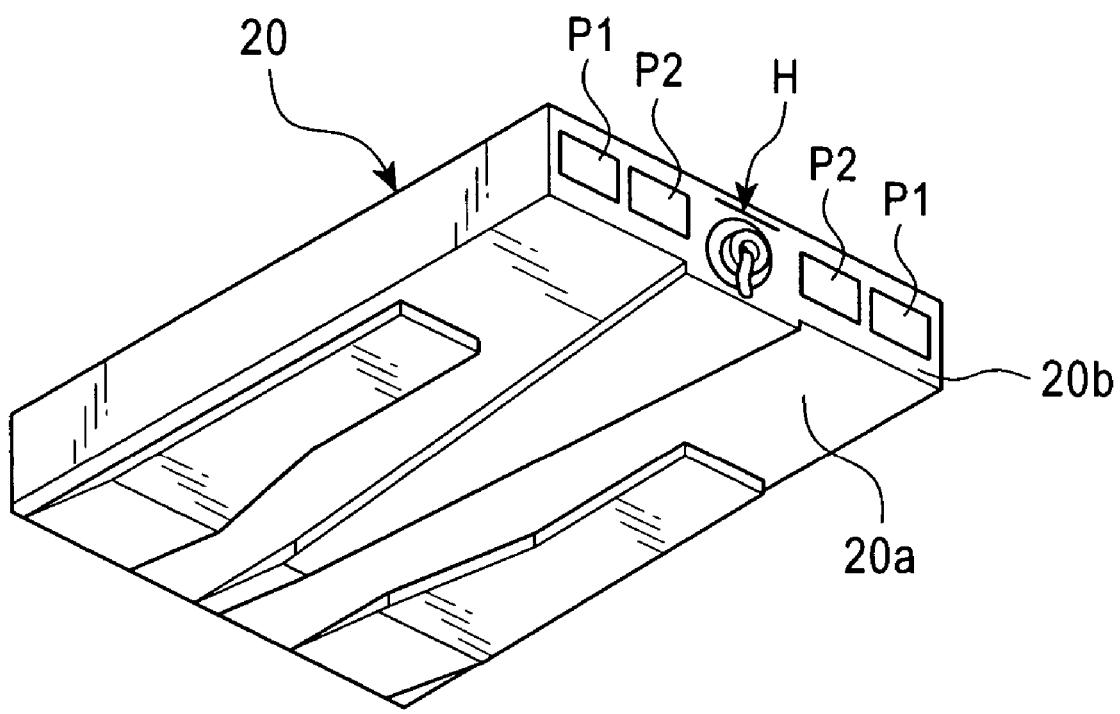
FIG. 1 is an overall perspective view of a slider which is provided with a magnetic head according to the present invention.
Figure 2:
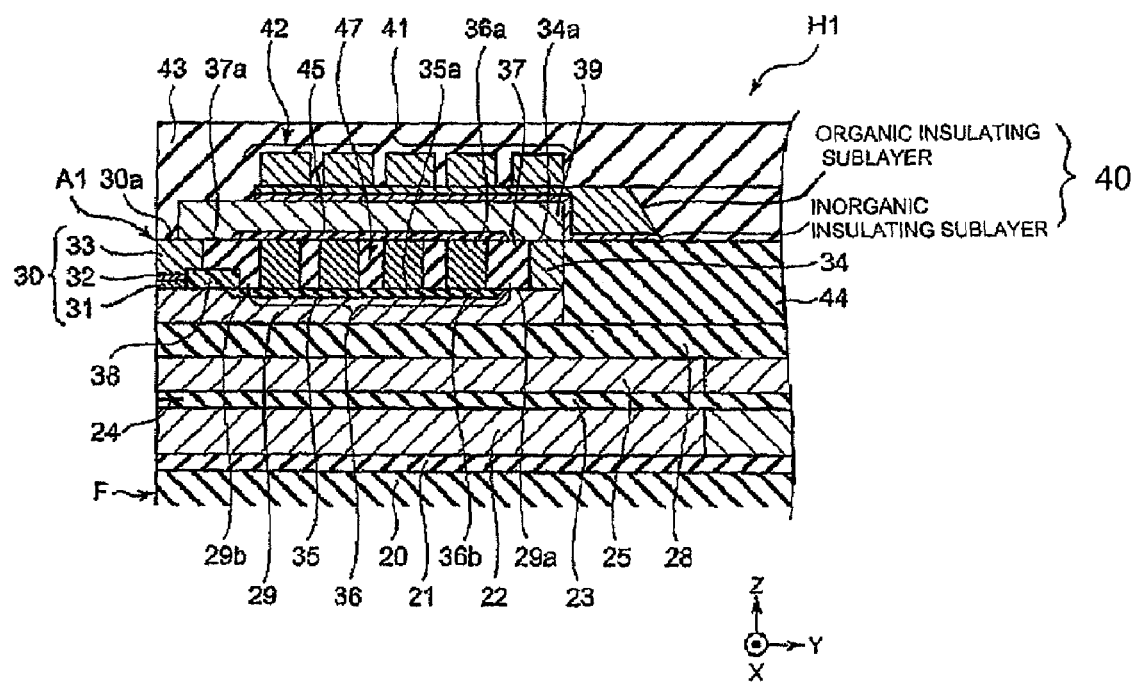
FIG. 2 is a partial sectional view of a magnetic head according to a first embodiment of the present invention.

FIG. 1 is an overall perspective view of a magnetic head device that includes a magnetic head of the present invention disposed on a slider. FIG. 2 is a partial sectional view of a magnetic head H1 according to a first embodiment of the present invention.

Hereinafter, the X direction shown in the figures is referred to as a track-width direction, the Y direction shown in the figures is referred to as a height direction. A recording medium (magnetic disk) travels in the Z direction shown in the figures. A front face (the left end in FIG. 2) of the magnetic head opposes a recording medium. Hereinafter, the front face of the magnetic head is referred to as "an opposing face". In each layer, "a front face (a front portion)" represents the left face in FIG. 2 and "a rear face (a rear portion)" represents the right face in FIG. 2.

The magnetic head described with reference to the figures is a composite type of a writing head (inductive head) and a reading head (magnetoresistance head; MR head). The magnetic head according to the present invention may include only the writing head.

In FIG. 1, a slider 20 is composed of, for example, alumina-titanium carbide ($Al_2O_3$—TiC). An opposing face 20a faces a recording medium. A magnetic head H1, terminals P1, P1, and terminals P2, P2 are disposed on a trailing end 20b of the slider 20. A toroidal coil 42 of an inductive head of the magnetic head H1 is connected to the terminals P1, P1 via a lead. When the MR head is provided with a magnetoresistive sensor, a sensing current is applied to the magnetoresistive sensor from the terminals P2, P2 and a magnetic signal is output from the terminals P2, P2.

With reference to FIG. 2, an $Al_2O_3$ layer 21 is disposed on the slider 20.

A lower shielding layer 22 composed of a NiFe-based alloy, a sendust alloy, or the like is disposed on the $Al_2O_3$ layer 21. A gap layer 23 which has an upper gap sublayer and a lower gap sublayer and composed of $Al_2O_3$ or the like is disposed on the lower shielding layer 22.

The gap layer 23 is provided with a magnetoresistive sensor 24 so that the front face of the magnetoresistive sensor 24 is exposed to an opposing face. The magnetoresistive sensor 24 includes a giant magnetoresistive (GMR) element such as a spin-valve thin-film element.

A second shielding layer 25 composed of a NiFe-based alloy or the like is provided on the gap layer 23.

The multilayer portion from the lower shielding layer 22 to the upper shielding layer 25 is referred to as a reading head (or MR head).

With reference to FIG. 2, a separating layer 28 composed of $Al_2O_3$ or the like is disposed on the upper shielding layer 25. The upper shielding layer 25 and the separating layer 28 can be omitted. In such a configuration, a lower core layer 29 is directly disposed on the upper gap sublayer 26 of the gap layer 23 and the lower core layer 29 functions as the upper shielding layer.

In FIG. 2, the lower core layer 29 is disposed on the separating layer 28. The lower core layer 29 is composed of a magnetic material such as a NiFe-based alloy and extends from the opposing face in the height direction (Y direction in FIG. 2) with a predetermined length.

A pole layer 30 provided on the lower core layer 29 and extends from the opposing face in the height direction (Y direction in FIG. 2) with a predetermined length. The width of the pole layer 30 in the track-width direction (X direction in FIG. 2) is a track width Tw. The track width Tw is, for example, less than 0.5 μm.

In the magnetic head H1 shown in FIG. 2, the pole layer 30 is composed of three layers, i.e. a lower pole sublayer 31, a gap sublayer 32, and an upper pole sublayer 33.

The lower pole sublayer 31, which is the bottommost sublayer of the pole layer 30, is formed by plating on the lower core layer 29. The lower pole sublayer 31 is composed of a magnetic material and is magnetically connected to the lower core layer 29. The lower pole sublayer 31 and the lower core layer 29 may or may not be composed of the same material. The lower pole sublayer 31 may have a single-layer or multilayer structure.

The gap sublayer 32 is disposed on the lower pole sublayer 31.

The gap sublayer 32 is composed of a non-magnetic metal material and is preferably formed by plating on the lower pole sublayer 31. Preferably, the non-magnetic metal material is at least one selected from the group consisting of NiP, NiReP, NiPd, NiW, NiMo, NiRh, NiRe, Au, Pt, Rh, Pd, Ru, and Cr. The gap sublayer 32 may have a single-layer or multilayer structure.

The upper pole sublayer 33 is formed by plating on the gap sublayer 32. In this embodiment, the upper pole sublayer 33 has a single-layer structure, but the present invention is not limited to this. The upper pole sublayer 33 may have, for example, a multilayer structure.

When the gap sublayer 32 is composed of the non-magnetic metal material, the lower pole sublayer 31, the gap sublayer 32, and the upper pole sublayer 33 can be successively formed by plating.

Preferably, the lower pole sublayer 31 and the upper pole sublayer 33 have higher saturation flux densities Bs than those of an upper core layer 39, the lower core layer 29, and a back gap layer 34. When the lower pole sublayer 31 and the upper pole sublayer 33, which face the gap sublayer 32, have high saturation flux densities, a recording magnetic field is concentrated into the gap and recording density can be improved.

The back gap layer 34 is disposed on the lower core layer 29 at a position distant from the rear face of the pole layer 30 by a predetermined distance in the height direction (Y direction in FIG. 2).

The back gap layer 34 may have a single-layer or multilayer structure. The back gap layer 34 and the lower core layer 29 may or may not be composed of the same magnetic material. The back gap layer 34 is magnetically connected to the lower core layer 29.

A coil-insulating base layer 35 (first insulating layer) is disposed at a space 47 which is surrounded by the pole layer 30, the back gap layer 34, and the lower core layer 29. The coil-insulating base layer 35 is composed of $Al_2O_3$, $SiO_2$, or the like. A plurality of first coil elements 36 is provided on the coil-insulating base layer 35 in parallel with each other in the height direction (Y direction in FIG. 2) and extends in the track-width direction (X direction in FIG. 2). The first coil elements 36 are composed of a conductive material having a low electrical resistance such as Cu or Au.

Gaps between the first coil elements 36 are filled with a coil insulator 37 which is composed of an inorganic insulating material such as $Al_2O_3$ or an organic insulating material such as a resist material. As shown in FIG. 2, the top faces of the pole layer 30, the first coil elements 36, the coil insulator 37, and the back gap layer 34 are disposed in one plane so as to form a planarized surface A1.

A gap depth-determining (Gd-determining) layer 38 is disposed on the lower core layer 29 at a position distant from the opposing face by a predetermined distance in the height direction (Y direction in FIG. 2). The rear portion of the Gd-determining layer 38 resides on the coil-insulating base layer 35. The rear portion of the upper pole sublayer 33 resides on the Gd-determining layer 38.

The gap depth (Gd) represents the length of the gap sublayer 32 in the height direction (Y direction in FIG. 2), i.e. from the opposing face to the front face of the Gd-determining layer 38.

A coil-insulating upper layer 45 (second insulating layer) composed of an organic material such as a resist material is disposed on the planarized surface A1 to cover the top faces 36a of the first coil elements 36. The coil-insulating upper layer 45 insulates the first coil elements 36 from the upper core layer 39.

The upper core layer 39 (magnetic layer) is formed by plating over the upper pole sublayer 33, the coil-insulating upper layer 45, and back gap layer 34. The upper core layer 39 connects to the lower core layer 29 via the back gap layer 34 at the rear end in the height direction.

The upper pole sublayer 33 may be made of the same material as the upper core layer 39, but is preferably made of a different material from the upper core layer 39. More preferably, the upper core layer 39 is made of a material having a lower saturation flux density Bs than that of the upper pole sublayer 33. For example, the saturation flux density of the upper core layer 39 ranges from 1.4 T to 1.9 T, and that of the upper pole sublayer 33 ranges from 1.9 T to 2.4 T.

When the saturation flux density of the upper core layer 39 is lower than that of the upper pole sublayer 33, erronous magnetic recording by a leakage magnetic field from the upper core layer 39 is effectively prevented.

With reference to FIG. 2, a coil-insulating layer 40 (third insulating layer) composed of an organic insulating material such as a resist material or an inorganic insulating material such as $Al_2O_3$ is disposed on the upper core layer 39. The coil-insulating layer 40 may be composed of either an organic insulating material or an inorganic insulating material. Preferably, it has a multilayer structure which is made by laminating an organic insulating material on an inorganic insulating material. Such a coil-insulating layer 40 composed of the inorganic material and the organic material is advantageous for fabricating second coil elements 41. Namely, when the second coil elements 41 are formed, a base film is plated and an excess plated base film is then removed. In the process for removing the excess plated base film, the inorganic insulating material functions as a protective layer that prevents damage during the fabrication processes.

With reference to FIG. 2, a plurality of second coil elements 41 is formed on the coil-insulating layer 40. The second coil elements 41 are composed of a conductive material having a low electrical resistance such as Cu or Au.

The first coil elements 36 and the second coil elements 41 are electrically connected at the respective ends in the track-width direction to form the toroidal coil 42 that is wound around the upper core layer 39.

A protective layer 43 composed of an insulating material such as $Al_2O_3$ and AlSiO on the toroidal coil 42. An insulating layer 44 extends from the rear faces of the lower core layer 29 and the back gap layer 34 in the height direction.

A recording current applied to the toroidal coil 42 induces recording magnetic field in the lower core layer 29 and the upper core layer 39, and generates a leakage magnetic field between the lower pole sublayer 31 and the upper pole sublayer 33 via the gap sublayer 32. A magnetic signal by the leakage magnetic field is recorded on the recording medium such as a hard disk.

As shown in FIG. 2, in the magnetic head H1 according to the present invention, a recess 29b is formed on the lower core layer 29, and the coil-insulating base layer 35 is disposed so as to fill the recess 29b. The first coil elements 36 are provided on the coil-insulating base layer 35. Preferably, the top face 29a of the lower core layer 29 and the top face 35a of the coil-insulating base layer 35 reside at the same height. When the top faces 29a and 35a reside at the same height so as to have a planarized surface, a resist material applied in a process for forming the first coil elements 36 can be uniformly exposed. Since the entire resist material is uniformly exposed, the first coil elements 36 can be precisely provided. Therefore, the size of the gaps between the first coil elements 36 can be reduced, the magnetic head itself can be downsized, and the magnetic path length can be shortened. The first coil elements 36 can be provided by a pattern formation with a precise dimension and a uniform thickness.

Preferably, the top face 35a of the coil-insulating base layer 35 is planarized. When the top face 35a of the coil-insulating base layer 35 is disposed so as to have the planarized surface, the resist material applied in the process for forming the first coil elements 36 can be uniformly exposed. Since the exposure is uniform over the entire resist material, the size of the gaps between the first coil elements 36 can be reduced, the magnetic head itself can be downsized, and the magnetic path length can be shortened. The first coil elements 36 can be formed by a pattern formation with a precise dimension and a uniform thickness.

A planarized surface A1 is formed by the top faces 36a of the first coil elements 36, the top face 30a of the pole layer 30, the top face 37a of the coil insulator 37, and the top face 34a of the back gap layer 34.

In the magnetic head H1, the recess 29b is formed on the lower core layer 29. The coil-insulating base layer 35 is disposed on the recess 29b, and then the first coil elements 36 are provided on the coil-insulating base layer 35. Therefore, the bottom faces 36b of the first coil elements 36 can be arranged at substantially the same height as the top face 29a of the lower core layer 29. The top faces 36a of the first coil elements 36 extend to the planarized surface A1. Therefore, thick first coil elements 36 can be formed.

Recently, downsizing of inductive heads has been carried out in response to a demand for a higher recording density. As described above, even though the size of the space where the first coil elements 36 are provided is decreased, the cross-sectional area of the first coil elements 36 can be increased. Therefore, the direct-current resistance of the first coil elements 36 can be reduced. As a result, in a magnetic head according to this embodiment, Joule heat generated by a recording current flowing in the toroidal coil 42 can be reduced and a rise in temperature inside the magnetic head H1 can be inhibited.

The thermal expansion coefficients of the toroidal coil 42, lower core layer 29, and the upper core layer 39 composed of metal materials are different from those of the insulating materials, such as the coil insulator 37 and the protective layer 43, covering the circumference of these components. When the temperature inside the magnetic head H1 rises, the portion in which the magnetic head H1 is disposed readily protrudes from an opposing face, i.e. pole tip protrusion (PTP) occurs.

When PTP occurs, the frequency of collision of the inductive head with the recording medium increases. As a result, the recording medium and the inductive head are easily damaged.

In the magnetic head H1 of the present invention, since the cross-sectional area of the first coil elements 36 can be increased, the direct-current resistance of the first coil elements 36 can be reduced. Therefore, Joule heat generated by a recording current flowing in the toroidal coil 42 can be reduced and the occurrence of the PTP is effectively inhibited. As a result, the frequency of collision of the magnetic head H1 with the recording medium is reduced and damage to the recording medium and the magnetic head is prevented.

The toroidal coil 42 is composed of the first coil elements 36 and the second coil elements 41. In general, when the direct-current resistance of the first coil elements 36 disposed between magnetic poles, i.e. the lower core layer 29 and the upper core layer 39, is reduced, Joule heat is effectively decreased. In the magnetic head H1 of the present invention, since the cross-sectional area of the first coil elements 36 placed between the lower core layer 29 and the upper core layer 39 can be increased, the direct-current resistance is reduced and Joule heat is advantageously reduced.

Figure 3:
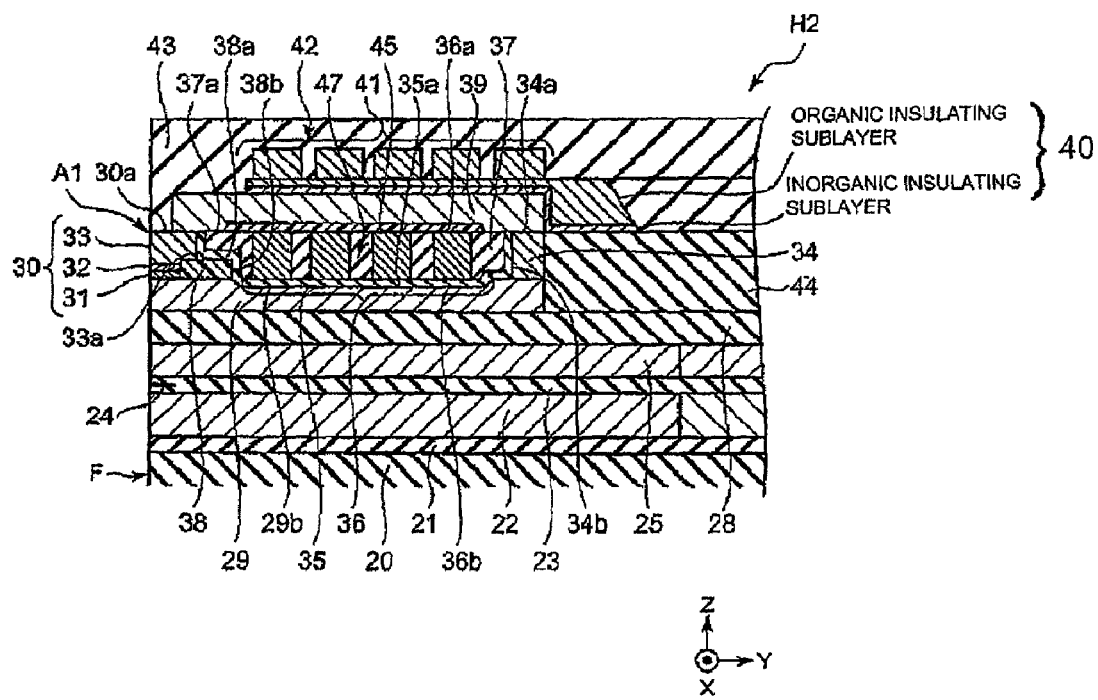
FIG. 3 is a partial sectional view of a magnetic head according to a second embodiment of the present invention.

FIG. 3 is a partial longitudinal sectional view of a magnetic head H2 according to a second embodiment of the present invention.

The magnetic head H2 shown in FIG. 3 includes the same components as the magnetic head H1 shown in FIG. 2. Therefore, components of the magnetic head H2 shown in FIG. 3 being the same as those of the magnetic head H1 shown in FIG. 2 are referred to with the same reference numerals and the description thereof is omitted.

The magnetic head H2 shown in FIG. 3 is the same as the magnetic head H1 shown in FIG. 2 in that the first coil elements 36 are provided on the coil-insulating base layer 35 that fills the recess 29b formed on the lower core layer 29. However, the magnetic head H2 is different from the magnetic head H1 in that the coil-insulating base layer 35 continuously extends over a rear face 33a of the upper pole sublayer 33 in the height direction, a top face 38a and a rear face 38b of the Gd-determining layer 38, and a front face 34b (an opposing face, i.e. the opposite side of the rear face in the height direction) of the back gap layer 34.

In the magnetic head H2 having such a configuration shown in FIG. 3, the bottom faces 36b of the first coil elements 36 can be arranged at substantially the same height as the top face 29a of the lower core layer 29. The top faces 36a of the first coil elements 36 extend to a planarized surface A1. Therefore, thick first coil elements 36 can be provided and the direct-current resistance of the first coil elements 36 can be reduced. As a result, an increase in temperature inside the magnetic head H2 is inhibited and PTP is effectively prevented.

Figure 4:
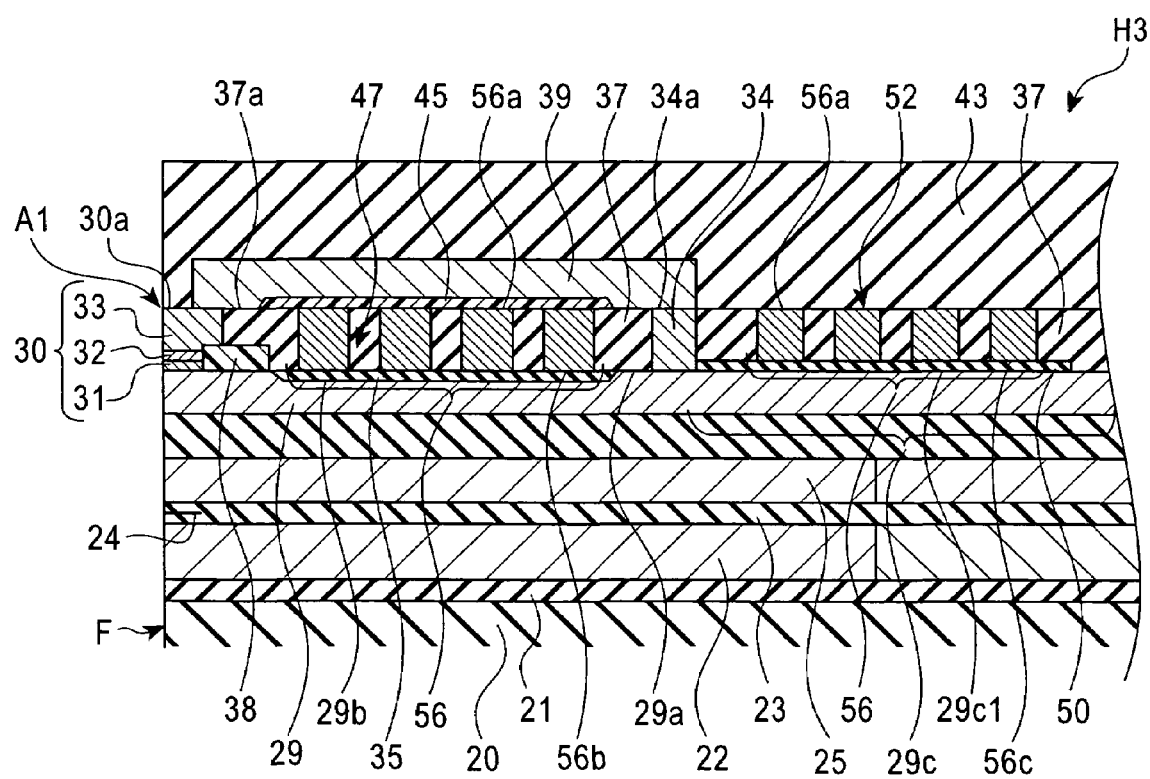
FIG. 4 is a partial sectional view of a magnetic head according to a third embodiment of the present invention.
Figure 4:
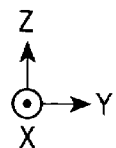

FIG. 4 is a partial longitudinal sectional view of a magnetic head H3 according to a third embodiment of the present invention.

The magnetic head H3 shown in FIG. 4 includes the same components as the magnetic head H1 shown in FIG. 2. Therefore, components of the magnetic head H3 shown in FIG. 4 being the same as those of the magnetic head H1 shown in FIG. 2 are referred to with the same reference numerals and the description thereof is omitted.

In the magnetic head H3 shown in FIG. 4, the lower core layer 29 has an extension 29c lying beyond the back gap layer 34 in the height direction. The coil-insulating base layer 35 fills the recess 29b on the lower core layer 29. In the space 47 surrounded by the pole layer 30, the back gap layer 34, and the lower core layer 29, coil elements 56 are provided on the coil-insulating base layer 35. In the magnetic head H3, other coil elements 56 are provided on a coil-insulating layer 50 formed on the extension 29c, which is outside the space 47 and extends beyond the back gap layer 34 in the height direction. The top face 29c1 of the lower core layer 29 of the extension 29c contacts the coil-insulating later 50. The gaps between these coil elements 56 are filled with a coil insulator 37. The coil elements 56 helically surround the back gap layer 34 to provide a spiral coil 52.

With reference to FIG. 4, the recess 29b is formed on the lower core layer 29 between the back gap layer 34 and the pole layer 30. The coil elements 56 are provided on the coil-insulating base layer 35 filling the recess 29b. Therefore, bottom faces 56b of the coil elements 56 provided on the coil-insulating base layer 35 can be provided at substantially the same height as the top face 29a of the lower core layer 29. The top faces 56a of the coil elements 56 which are provided on the lower core layer 29 between the back gap layer 34 and the pole layer 30 extend to a planarized surface A1, and the top faces 56a of the coil elements 56 which are provided over the extension 29c also extend to a planarized surface A1. Therefore, since the thickness of the coil elements 56 can be increased and the cross-sectional area of the coil elements 56 can be increased, the direct-current resistance of the coil elements 56 is reduced. As a result, an increase in temperature inside the magnetic head H3 is inhibited and PTP is effectively prevented.

The spiral coil 52 consists of the coil elements 56 disposed between the back gap layer 34 and the pole layer 30 and the coil elements 56 disposed on the extension 29c. The coil elements 56 provided between the back gap layer 34 and the pole layer 30 are disposed between the lower core layer 29 and the upper core layer 39, i.e. between magnetic poles. In general, when the direct-current resistance of the coil elements 56 disposed between magnetic poles is reduced, Joule heat is effectively decreased. In the magnetic head H3 of the present invention, since the cross-sectional area of these coil elements 56 residing between the lower core layer 29 and the upper core layer 39 can be increased, Joule heat is advantageously reduced.

Figure 5:
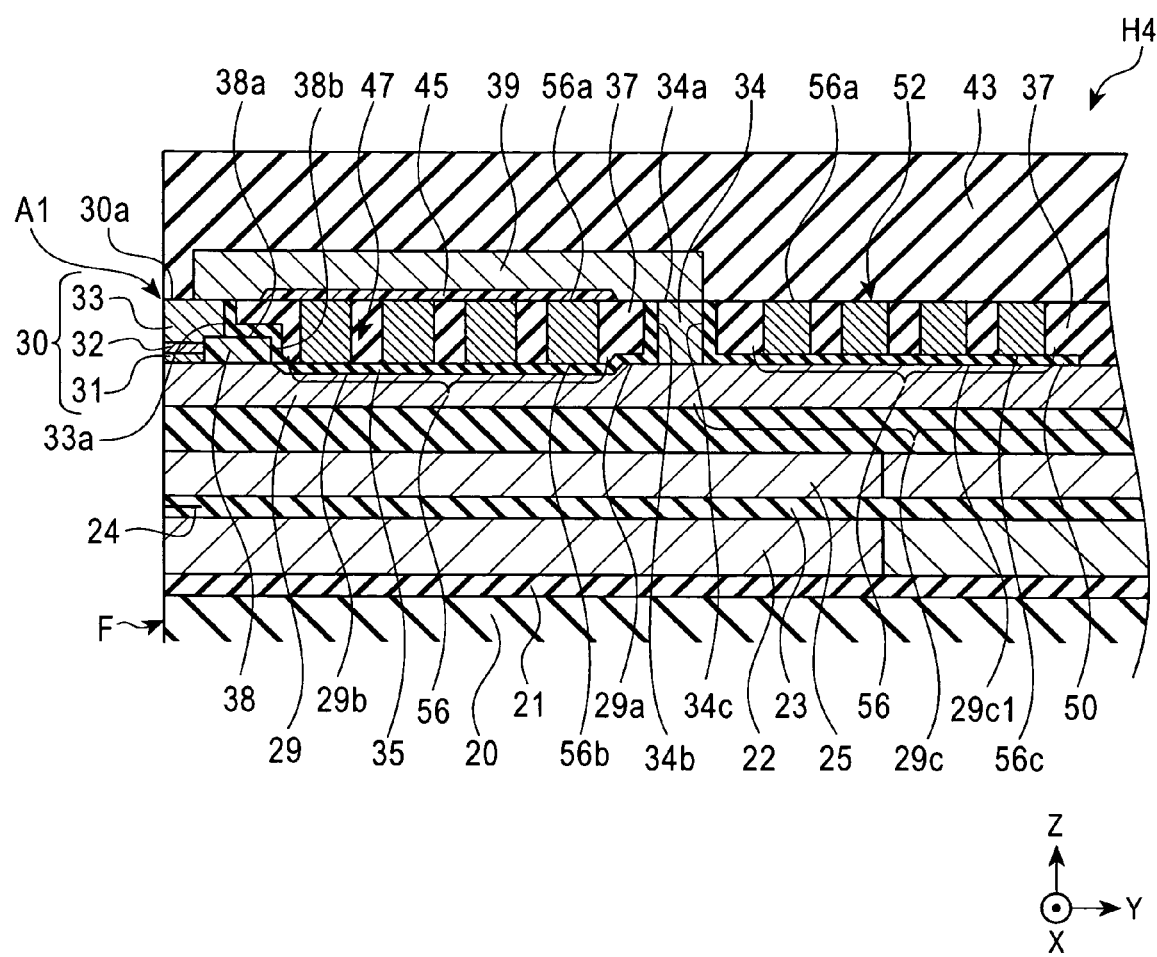
FIG. 5 is a partial sectional view of a magnetic head according to a fourth embodiment of the present invention.

FIG. 5 is a partial longitudinal sectional view of a magnetic head H4 according to a fourth embodiment of the present invention.

The magnetic head H4 shown in FIG. 5 includes the same components as the magnetic head H3 shown in FIG. 4. Therefore, components of the magnetic head H4 shown in FIG. 5 being the same as those of the magnetic head H3 shown in FIG. 4 are referred to with the same reference numerals and the description thereof is omitted.

The magnetic head H4 shown in FIG. 5 is the same as the magnetic head H3 shown in FIG. 4 in that the coil-insulating base layer 35 fills the recess 29b formed on the lower core layer 29 between the back gap layer 34 and the pole layer 30 and the coil elements 56 are disposed on the coil-insulating base layer 35. However, the magnetic head H4 is different from the magnetic head H3 in that the coil-insulating base layer 35 continuously extends over a rear face 33a of the upper pole sublayer 33 in the height direction, a top face 38a and a rear face 38b of the Gd-determining layer 38, and a front face 34b (an opposing face, i.e. the opposite side of the rear face in the height direction) of the back gap layer 34.

The magnetic head H4 shown in FIG. 5 is the same as the magnetic head H3 shown in FIG. 4 in that the coil elements 56 are provided on the coil-insulating layer 50 which is disposed on the extension 29c. The magnetic head H4 is different from the magnetic head H3 in that the coil-insulating layer 50 extends to a rear face 34c of the back gap layer 34 in the height direction.

In the magnetic head H4 having such a configuration shown in FIG. 5, the bottom faces 56b of the coil elements 56 can be arranged at substantially the same height as the top face 29a of the lower core layer 29 between the back gap layer 34 and the pole layer 30. Both of the top faces 56a of the coil elements 56 over the recess 29b and the top faces 56a of the coil elements 56 over the extension 29c lie in a planarized surface A1. Therefore, since the thickness of the coil elements 56 can be increased and the cross-sectional area of the coil elements 56 can be increased, the direct-current resistance of the coil elements 56 is reduced. As a result, an increase in temperature inside the magnetic head H4 is inhibited and PTP is effectively prevented.

Each of the magnetic head H3 shown in FIG. 4 and the magnetic head H4 shown in FIG. 5 does not have a recess on the extension 29c. Consequently, the bottom faces 56c of the coil elements 56 disposed over the extension 29c are higher than the top surface 29a of the lower core layer 29. However, a recess 29b may be formed on the extension 29c and the coil elements 56 may be arranged on a coil-insulating base layer 35 which fills the recess 29b. With such a configuration, since the bottom faces 56c of the coil elements 56 disposed over the extension 29c can be arranged at substantially the same height as the top face 29a of the lower core layer 29, the cross-sectional area of the coil elements 56 can be further increased.

A method for fabricating the magnetic head H1 shown in FIGS. 1 and 2 will now be described with reference to process charts shown in FIGS. 6 to 14. A method for fabricating the layers from the lower core layer 29 to the second coil elements 41 shown in FIG. 2 will be described. The process charts shown in FIGS. 6 to 14 are longitudinal sectional views (i.e. cross-sectional views from a plane parallel to the Y-Z plane in these drawings) of a thin-film magnetic head during fabrication. The process charts for fabricating magnetic heads shown in FIGS. 3 to 5 are similarly drawn as longitudinal sectional views.

Figure 6:
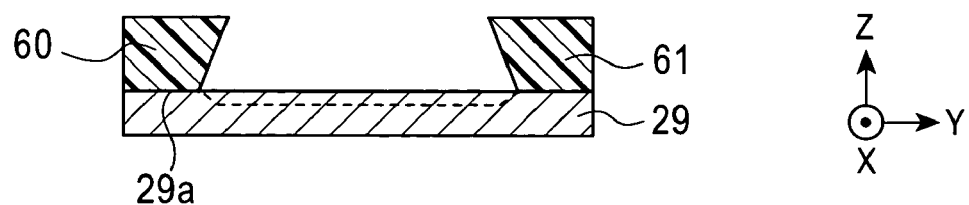
FIG. 6 is a process chart for fabricating the magnetic head shown in FIG. 2.
Figure 7:
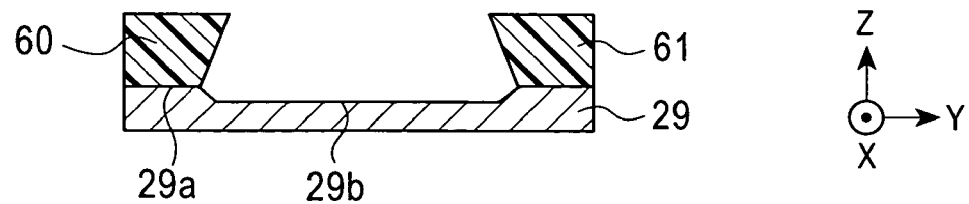
FIG. 7 is a process chart illustrating the next step of the process shown in FIG. 6.

In a process shown in FIG. 6, a lower core layer 29 is formed by plating, for example, a NiFe-based alloy, and then the top face 29a of the lower core layer 29 is polished by a chemical-mechanical polishing (CMP) technology or the like to provide a flat face. Resist layers 60 and 61 are then formed on the lower core layer 29 with a predetermined space in the height direction. A recess 29b is formed by ion milling or the like at a portion shown by a dotted line. The resulting state is shown in FIG. 7.

Figure 8:
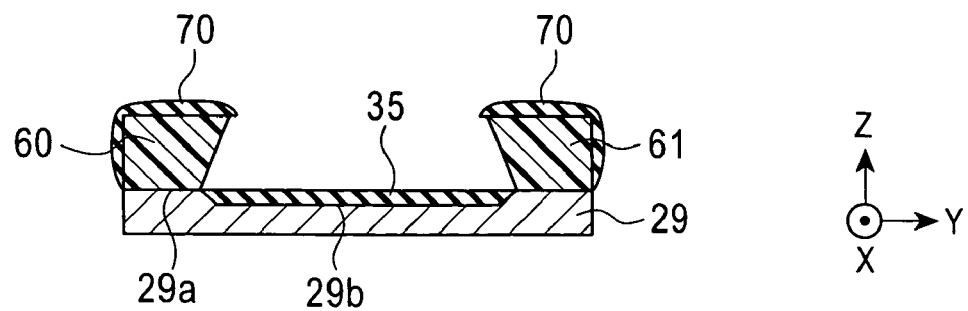
FIG. 8 is a process chart illustrating the next step of the process shown in FIG. 7.

With reference to FIG. 8, a coil-insulating base layer 35 is formed by a known method such as sputtering so as to fill the recess 29b. A material 70 used for forming the coil-insulating base layer 35 is unintentionally deposited on the resist layers 60 and 61. Preferably, the top face 35a of the coil-insulating base layer 35 and the top face 29a of the lower core layer 29 lie in the same plane. Therefore, it is preferable that the process for forming the coil-insulating base layer 35 be stopped when the top face 35a of the lower core layer 35 is formed at the same height as the top face 29a of the lower core layer 29. However, the coil-insulating base layer 35 is formed so that its top face 35a resides above the top face 29a of the lower core layer 29 and then the top face 35a of the coil-insulating base layer 35 may be polished by a known method such as CMP technology so that both the top faces 35a and 29a lie in the same plane.

In such a configuration, the top face 29a of the lower core layer and the top face 35a of the coil-insulating base layer 35 can provide a planarized surface. Therefore, a resist material in a process shown in FIG. 9 for providing first coil elements 36 can be uniformly exposed. Since the entire resist materials are uniformly exposed, the first coil elements 36 can be formed precisely. Consequently, since the size of the gaps between the first coil elements 36 can be reduced, the magnetic head itself and the magnetic path length can be decreased. The first coil elements 36 can be provided by a pattern formation with a precise dimension and a uniform thickness.

Preferably, the top face 35 of the coil-insulating base layer 35 is planarized. As the same way that the top face 29a of the lower core layer 29 and the top face 35a of the coil-insulating base layer 35 are disposed to have a uniform plane, the planarized coil-insulating base layer 35 enables the resist material in a process for providing the first coil elements 36 being uniformly exposed. Since the entire resist material is uniformly exposed, the size of the gaps between the first coil elements 36 can be reduced. Consequently, the magnetic head itself and the magnetic path length can be decreased. The first coil elements 36 can be provided by a pattern formation with a precise dimension and a uniform thickness.

Figure 9:
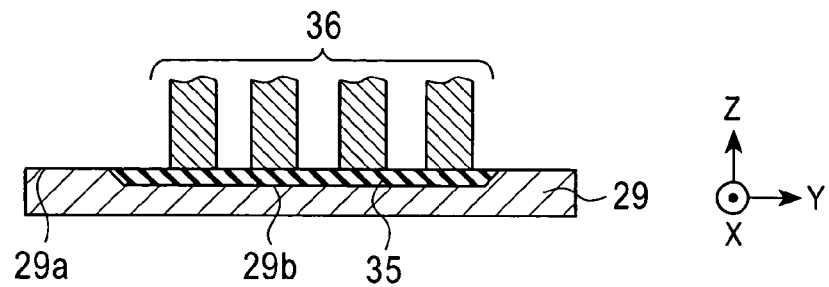
FIG. 9 is a process chart illustrating the next step of the process shown in FIG. 8.

With reference to FIG. 9, the resist layers 60 and 61, on which the material 70 used for forming the coil-insulating base layer 35 is deposited, are removed, and then a resist pattern (not shown) of the first coil elements 36 is formed on the coil-insulating base layer 35 by exposure and development. The first coil elements 36 are formed by a known method such as a plating process. A plurality of the first coil elements 36 are formed so as to be parallel with the track-width direction (X direction in FIG. 9) or to be parallel with each other with a tilt from the track-width direction (X direction in FIG. 9) to the height direction (Y direction in FIG. 9).

Figure 10:
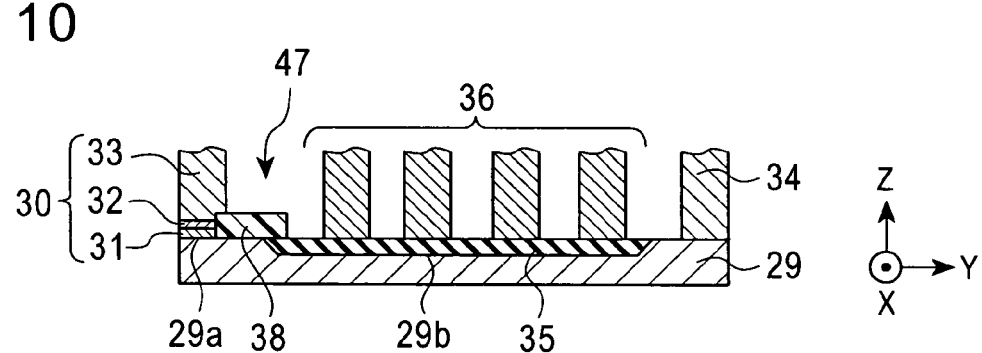
FIG. 10 is a process chart illustrating the next step of the process shown in FIG. 9.

With reference to FIG. 10, a Gd-determining layer 38 is formed on the top face 29a of the lower core layer 29 at a position distant from the opposing face by a predetermined distance in the height direction (Y direction in FIG. 10). A seeding layer (not shown) for plating is formed with a NiFe alloy, a FeCo alloy, or the like, and then a resist layer (not shown) is patterned. A pole layer 30 is formed by plating a lower pole sublayer 31, a gap sublayer 32, and then an upper pole sublayer 33 on the patterned resist layer. A back gap layer 34 is also formed. The resist layer (not shown) is then removed. The pole layer 30, the back gap layer 34, and the lower core layer 29 define a space 47.

Figure 11:
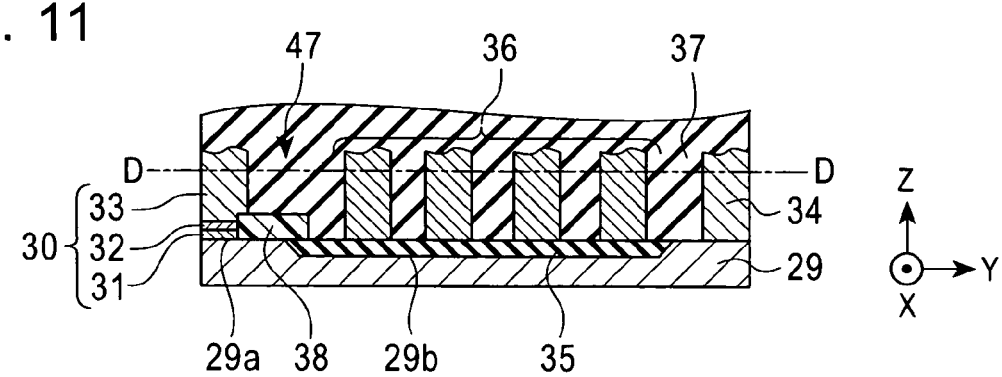
FIG. 11 is a process chart illustrating the next step of the process shown in FIG. 10.
Figure 12:
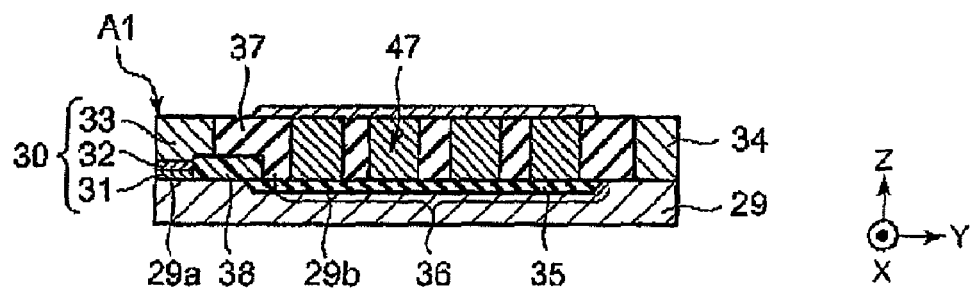
FIG. 12 is a process chart illustrating the next step of the process shown in FIG. 11.

With reference to FIG. 11, a coil insulator 37 is formed between and on the pole layer 30, the first coil elements 36, and the back gap layer 34. The pole layer 30, the coil insulator 37, the first coil elements 36, and the back gap layer 34 are polished by a CMP technology or the like to provide a planarized surface A1 in parallel with an X-Y plane at the D-D line shown in FIG. 11. FIG. 12 illustrates the resulting state.

Figure 13:
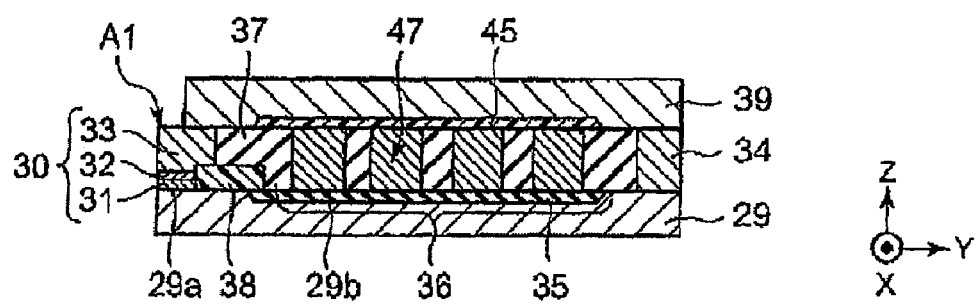
FIG. 13 is a process chart illustrating the next step of the process shown in FIG. 12.

With reference to FIG. 13, a coil-insulating upper layer 45 is formed so as to cover the top faces 36a of the first coil elements 36, and then an upper core layer (magnetic layer) 39 is formed by plating over the upper pole sublayer 33, the coil-insulating upper layer 45, and the back gap layer 34.

Figure 14:
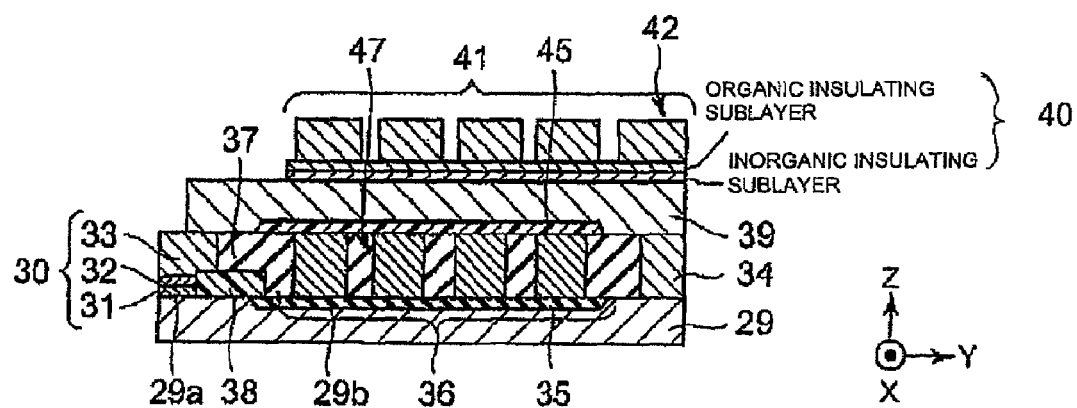
FIG. 14 is a process chart illustrating the next step of the process shown in FIG. 13.

With reference to FIG. 14, a coil-insulating layer 40 is formed on the upper core layer 39, and then second coil elements 41 are formed on the coil-insulating layer 40 by a known method such as a plating process. The second coil elements 41 are electrically connected to the first coil elements 36 at the respective ends in the track-width direction to form a toroidal coil 42 that is wound around the upper core layer 39.

The coil-insulating layer 40 may be composed of either an organic insulating material or an inorganic insulating material. Preferably, it has a multilayer structure which is made by laminating an organic insulating material on an inorganic insulating material. Such the coil-insulating layer 40 composed of the inorganic material and the organic material is advantageous for fabricating second coil elements 41. Namely, when the second coil elements 41 are formed, a base film is plated and an excess plated base film is then removed. In the process for removing the excess plated base film, the inorganic insulating material functions as a protective layer that prevents damage during the fabrication process.

A protective layer 43 (see FIG. 2) is formed on the toroidal coil 42 with an insulating material such as $Al_2O_3$ and AlSiO to provide a magnetic head H1 shown in FIG. 2.

A method of fabricating the magnetic head H2 shown in FIG. 3 will now be described.

Figure 15:
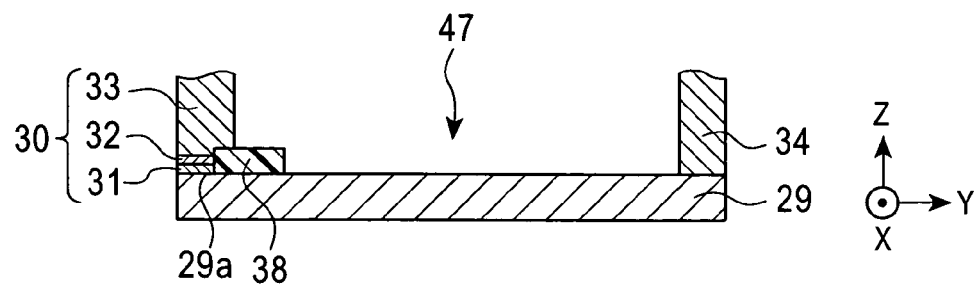
FIG. 15 is a process chart for fabricating the magnetic head shown in FIG. 3.

In the fabrication of the magnetic head H2, a lower core layer 29 is formed and then the top face 29a of the lower core layer 29 is polished by a CMP technology or the like as shown in FIG. 6 for fabricating the magnetic head H1. As shown FIG. 15, a Gd-determining layer 38 is formed on the top face 29a at a position distant from the opposing face by a predetermined distance in the height direction (Y direction in the figures). A seeding layer (not shown) for plating is formed with a NiFe alloy, a FeCo alloy, or the like, and then a resist layer (not shown) is patterned. A pole layer 30 is formed by plating a lower pole sublayer 31, a gap sublayer 32, and then an upper pole sublayer 33 on the patterned resist layer. A back gap layer 34 is also formed. The resist layer (not shown) is then removed. The pole layer 30, the back gap layer 34, and the lower core layer 29 define a space 47.

Figure 16:
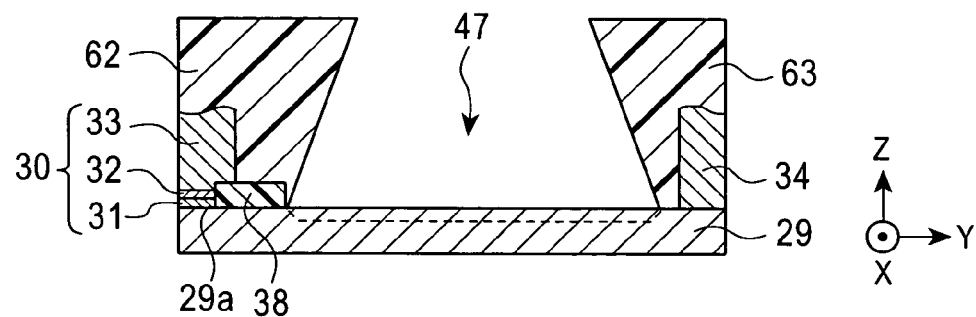
FIG. 16 is a process chart illustrating the next step of the process shown in FIG. 15.
Figure 17:
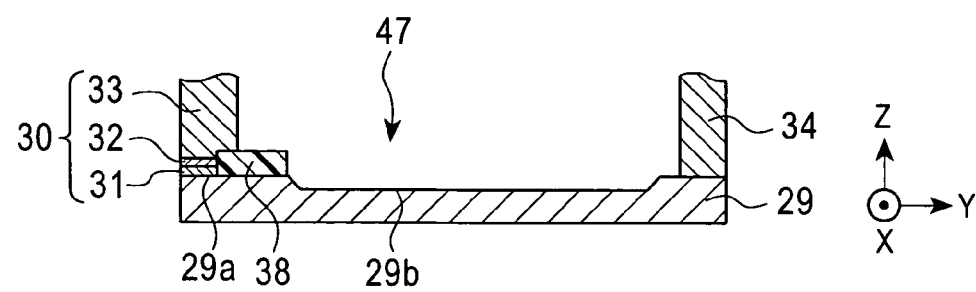
FIG. 17 is a process chart illustrating the next step of the process shown in FIG. 16.

With reference to FIG. 16, resist layers 62 and 63 are formed to cover the pole layer 30, the Gd-determining layer 38, and the back gap layer 34. A recess 29b is formed by an ion milling operation or the like at a portion shown by a dotted line. The resist layers 62 and 63 are then removed. The resulting state is shown in FIG. 17.

Since the resist layer 62 protects the pole layer 30, damage to the pole layer 30 during the ion milling operation is prevented. Therefore, a track width Tw is accurately secured.

Figure 18:
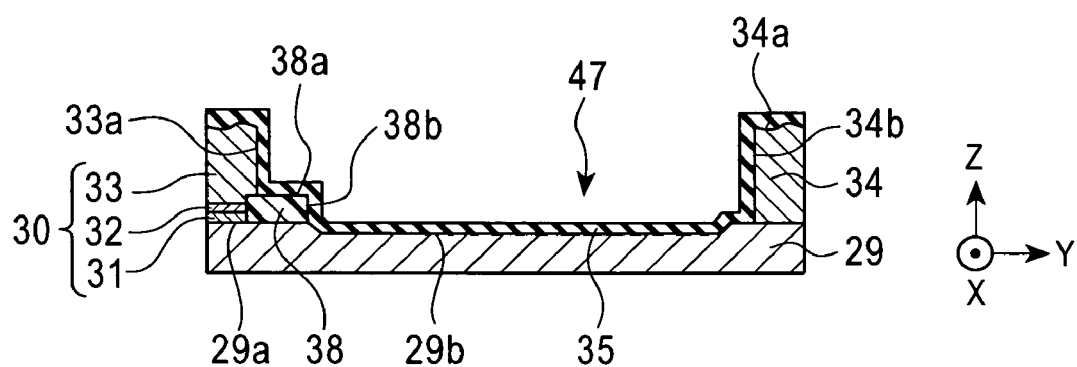
FIG. 18 is a process chart illustrating the next step of the process shown in FIG. 17.

As shown in FIG. 18, a coil-insulating base layer 35 is continuously formed over a rear face 33a of the upper pole sublayer 33 in the height direction, a top face 38a and a rear face 38b of the Gd-determining layer 38, the recess 29b, and a front face 34b (an opposing face, i.e. the opposite side of the rear face in the height direction) and the top face 34a of the back gap layer 34.

Figure 19:
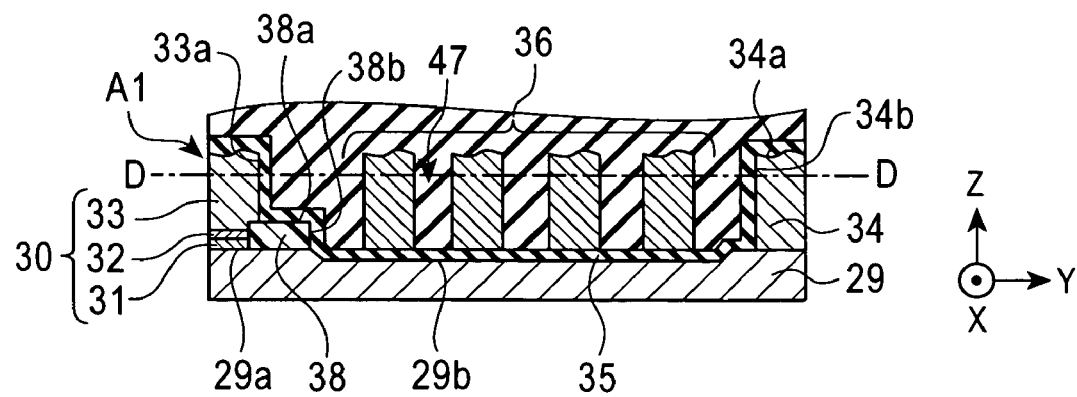
FIG. 19 is a process chart illustrating the next step of the process shown in FIG. 18.

With reference to FIG. 19, first coil elements 36 are patterned on the coil-insulating base layer 35 disposed in the space 47. The first coil elements 36 are formed by a known method such as a plating process. A coil insulator 37 is formed on the coil-insulating base layer 35 so as to fill the gaps between the first coil elements 36 and cover the coil-insulating base layer 35 and the first coil elements 36. The pole layer 30, the coil insulator 37, the first coil elements 36, the coil-insulating base layer 35, and the back gap layer 34 are polished by a CMP technology or the like to form a planarized surface A1 at the D-D line shown in FIG. 19 in parallel with an X-Y plane.

A coil-insulating upper layer 45, an upper core layer 39, a coil-insulating layer 40, and second coil elements 41 are formed as shown in FIGS. 12 to 14 to fabricate the magnetic head H1 shown in FIG. 2. A protective layer 43 (See FIG. 3) is then formed to provide the magnetic head H2 shown in FIG. 3.

A method for fabricating a magnetic head shown in FIG. 4 will now be described.

Figure 20:
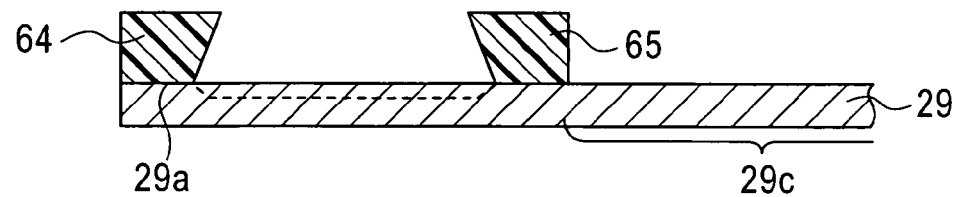
FIG. 20 is a process chart for fabricating the magnetic head shown in FIG. 4.
Figure 21:
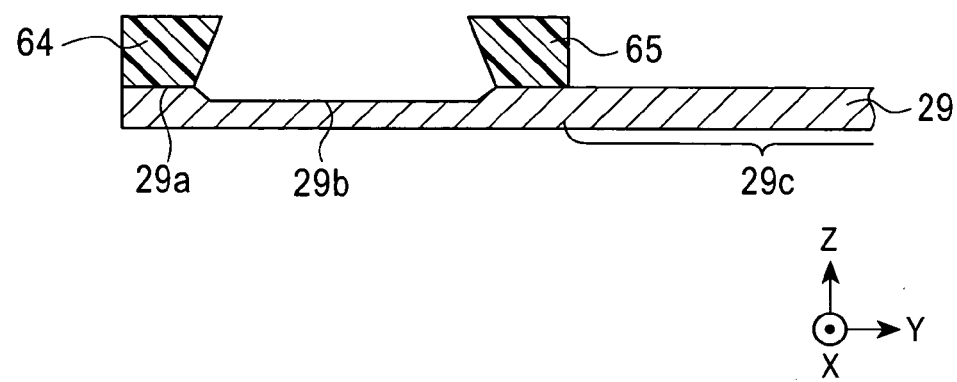
FIG. 21 is a process chart illustrating the next step of the process shown in FIG. 20.

In a process shown in FIG. 20, a lower core layer 29 is formed by plating a NiFe-based alloy or the like and the top face 29a of the lower core layer 29 is polished by a CMP technology or the like to form a planarized surface. An extension 29c of the lower core layer 29, which extends beyond a back gap layer 34 (described later) in the height direction, is formed in this step. Resist layers 64 and 65 are formed so as to be distant from each other with a predetermined distance in the height direction on the lower core layer 29. A recess 29b is formed on the portion of the lower core layer 29 shown by a dotted line in FIG. 20. The resulting state is shown in FIG. 21.

Figure 22:
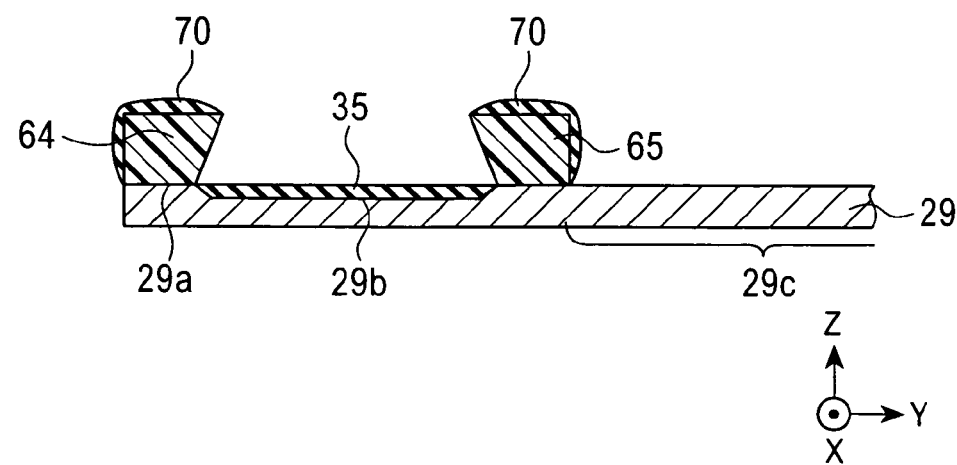
FIG. 22 is a process chart illustrating the next step of the process shown in FIG. 21.

With reference to FIG. 22, a coil-insulating base layer 35 is formed by a known method such as sputtering so as to fill the recess 29b. A material 70 used for forming the coil-insulating base layer 35 is unintentionally deposited on the resist layers 64 and 65. Preferably, the top face 35a of the coil-insulating base layer 35 and the top face 29a of the lower core layer 29 lie in the same plane. Therefore, it is preferable that the process for forming the coil-insulating base layer 35 be stopped when the top face 35a of the lower core layer 35 is formed at the same height as the top face 29a of the lower core layer 29. However, the coil-insulating base layer 35 may be disposed so that its top face 35a resides above the top face 29a of the lower core layer 29 and then the top face 35a of the coil-insulating base layer 35 is polished until both the top faces 35a and 29a lie in the same plane.

Figure 23:
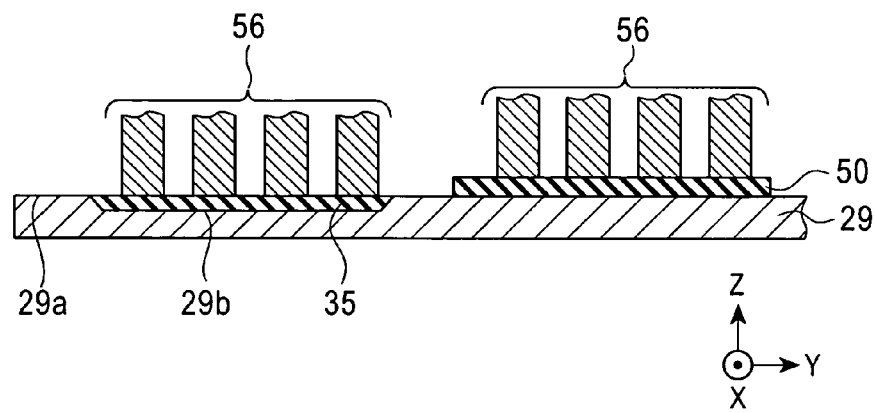
FIG. 23 is a process chart illustrating the next step of the process shown in FIG. 22.

With reference to FIG. 23, the resist layers 64 and 65, on which the material 70 used for forming the coil-insulating base layer 35 are deposited, are removed and then coil elements 56 are patterned on the coil-insulating base layer 35. A coil insulating layer 50 is formed on the extension 29c and coil elements 56 are patterned on this coil insulating layer 50. These coil elements 56 are formed by a known method such as a plating process so as to be wound around a back gap layer 34 (described later).

Figure 24:
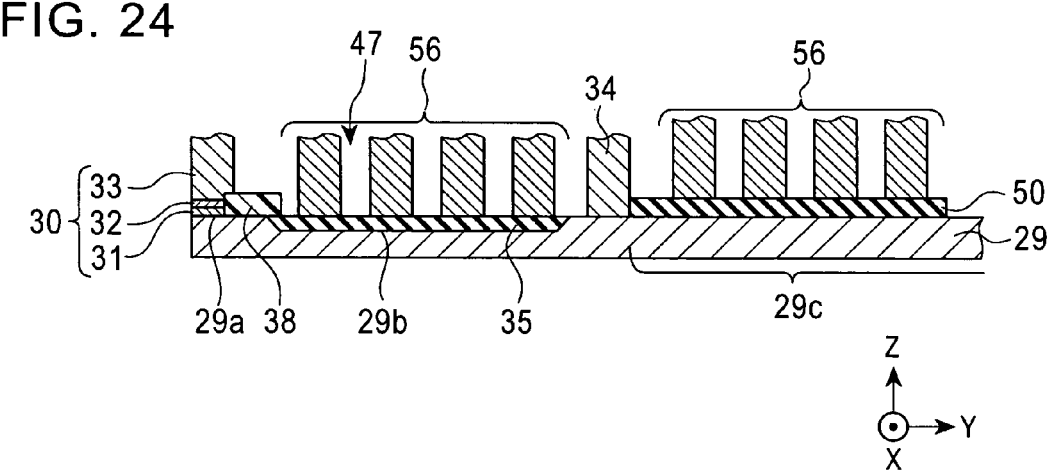
FIG. 24 is a process chart illustrating the next step of the process shown in FIG. 23.

With reference to FIG. 24, a Gd-determining layer 38 is formed on the top face 29a of the lower core layer 29 at a position distant from an opposing face by a predetermined distance in the height direction (the Y direction in FIG. 24). A seeding layer (not shown) for plating is formed with a NiFe alloy, a FeCo alloy, or the like, and then a resist layer (not shown) is patterned on the seeding layer. A pole layer 30 is formed by plating a lower pole sublayer 31, a gap sublayer 32, and then an upper pole sublayer 33 on the patterned resist layer. A back gap layer 34 is also formed. The resist layer (not shown) is then removed. The pole layer 30, the back gap layer 34, and the lower core layer 29 define a space 47. The portion of the lower core layer 29 extending beyond the back gap layer 34 in the height direction is the extension 29c.

Figure 25:
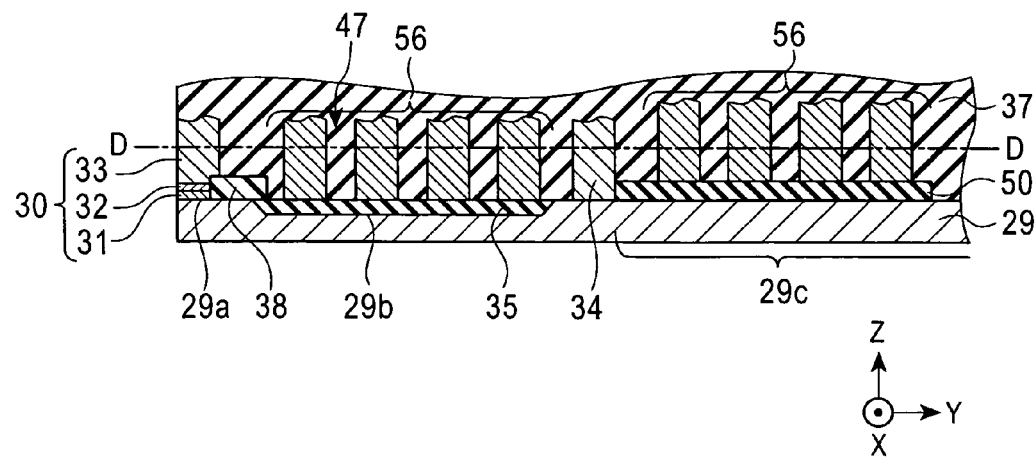
FIG. 25 is a process chart illustrating the next step of the process shown in FIG. 24.
Figure 26:
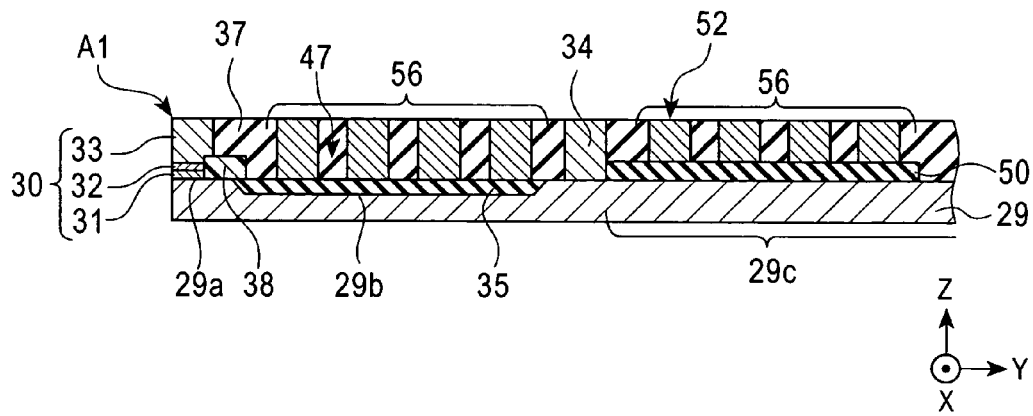
FIG. 26 is a process chart illustrating the next step of the process shown in FIG. 25.

With reference to FIG. 25, a coil insulator 37 is formed between and on the pole layer 30, the coil elements 56, and the back gap layer 34. Then, the pole layer 30, the coil insulator 37, the coil elements 56, and the back gap layer 34 are polished by a CMP technology or the like to provide a planarized surface A1 at the D-D line shown in FIG. 25 in parallel with an X-Y plane. The resulting state is shown in FIG. 26.

The processes illustrated in FIGS. 13 and 14 for fabricating the magnetic head H1 shown in FIG. 2 are conducted and then a protective layer 43 is formed (see FIG. 4) to provide the magnetic head H3 shown in FIG. 4.

A method for fabricating a magnetic head H4 shown in FIG. 5 will now be described.

Figure 27:
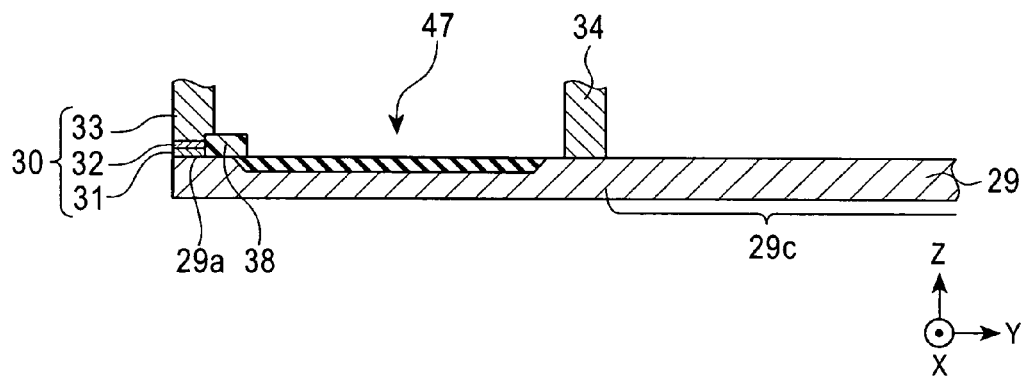
FIG. 27 is a process chart for fabricating the magnetic head shown in FIG. 5.

In the fabrication of the magnetic head H4, a lower core layer 29 is formed and the top face 29a of the lower core layer 29 is planarized by a CMP technology or the like as shown in FIG. 20 for fabricating the magnetic head H3. As shown in FIG. 27, a Gd-determining layer 38 is formed on the top face 29a at a position distant from an opposing face by a predetermined distance in the height direction (Y direction in FIG. 27). A seeding layer (not shown) for plating is formed with a NiFe alloy, a FeCo alloy, or the like, and then a resist layer (not shown) is patterned. A pole layer 30 is formed by plating a lower pole sublayer 31, a gap sublayer 32, and then an upper pole sublayer 33 on the patterned resist layer. A back gap layer 34 is also formed. The resist layer (not shown) is then removed. The pole layer 30, the back gap layer 34, and the lower core layer 29 define a space 47.

Figure 28:
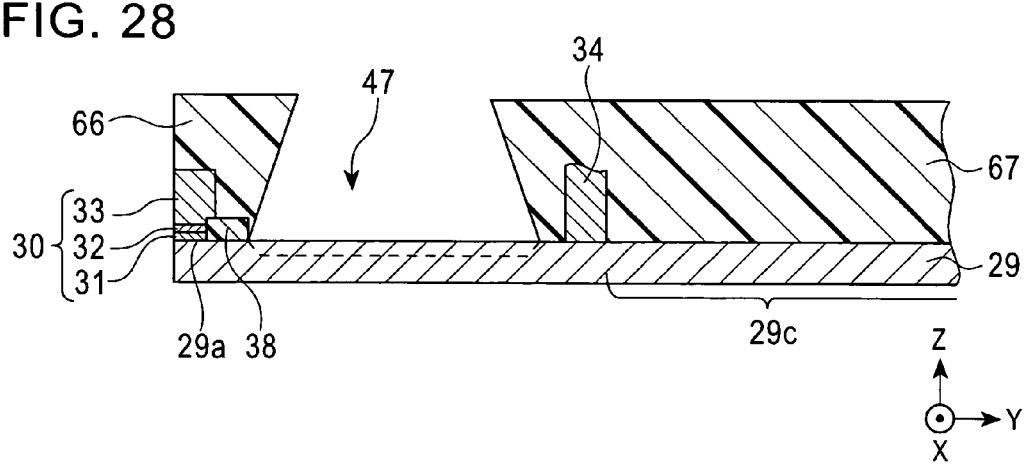
FIG. 28 is a process chart illustrating the next step of the process shown in FIG. 27.
Figure 29:
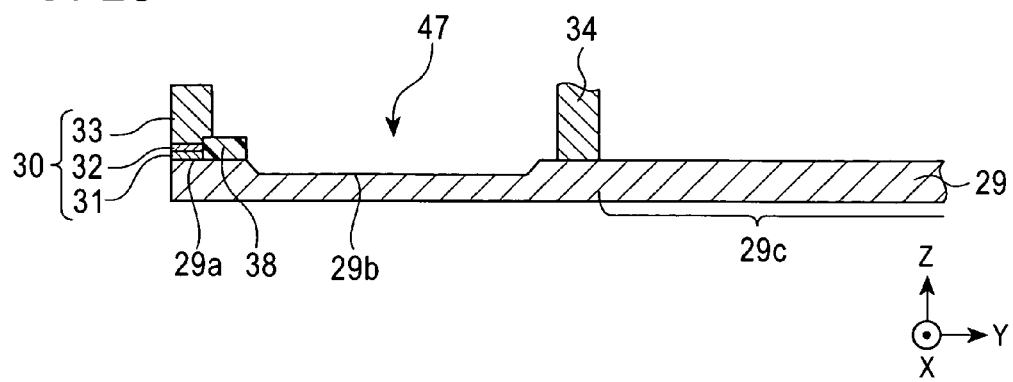
FIG. 29 is a process chart illustrating the next step of the process shown in FIG. 28.

With reference to FIGS. 28 and 29, resist layers 66 and 67 are formed to cover the pole layer 30, the Gd-determining layer 38, the back gap layer 34, and an extension 29c of the lower core layer 29. A recess 29b is formed by an ion milling operation at the portion of the lower core layer 29 shown by a dotted line in FIG. 28. The resist layers 66 and 67 are then removed. The resulting state is shown in FIG. 29.

Figure 30:
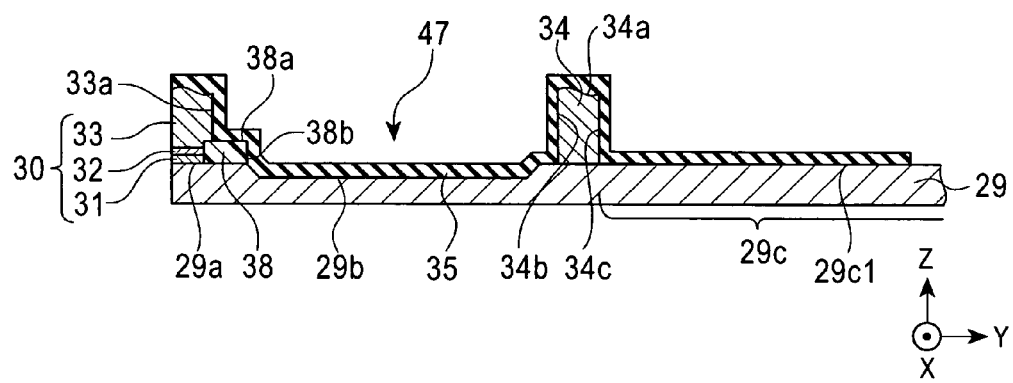
FIG. 30 is a process chart illustrating the next step of the process shown in FIG. 29.

With reference to FIG. 30, a coil-insulating base layer 35 is continuously formed over a rear face 33a of the upper pole sublayer 33 in the height direction, the top face 38a and the rear face 38b of the Gd-determining layer 38, the recess 29b, a front face 34b of the back gap layer 34 (an opposing face, i.e. the opposite side of a rear face in the height direction), the top face 34a and the rear face 34c of the back gap layer 34, and a top face 29c1 of the extension 29c of the lower core layer 29.

Figure 31:
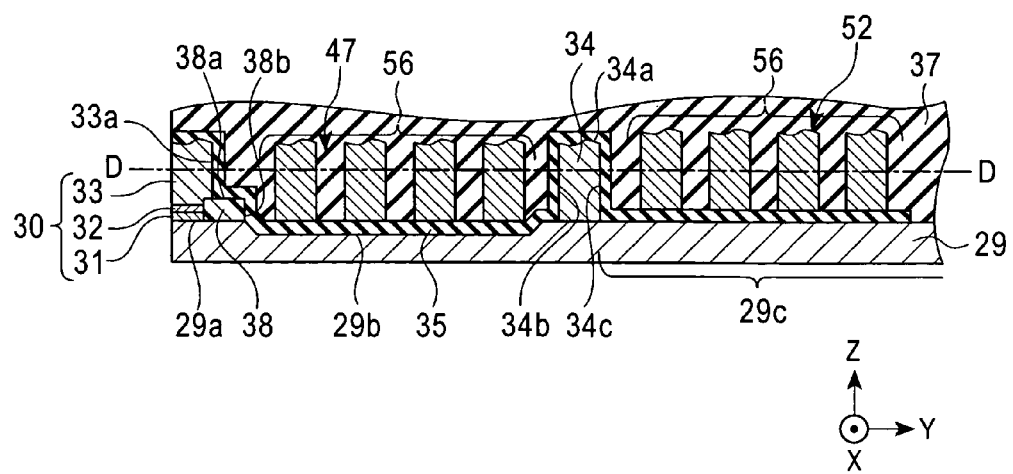
FIG. 31 is a process chart illustrating the next step of the process shown in FIG. 30.

With reference to FIG. 31, coil elements 56 are patterned on the coil-insulating base layer 35 to provide a spiral coil 52 that helically surround the back gap layer 34. The coil elements 56 are formed by a known method such as a plating process. A coil insulator 37 is formed between and on the coil-insulating base layer 35 and the coil elements 56. Then, the pole layer 30, the coil insulator 37, the coil elements 56, the coil-insulating base layer 35, and the back gap layer 34 are polished by a CMP technology or the like to form a planarized surface A1 at the D-D line shown in FIG. 31 in parallel with an X-Y plane.

The processes illustrated in FIGS. 12 to 14 for fabricating the magnetic head H1 shown in FIG. 2 are conducted and then a protective layer 43 is formed (see FIG. 5) to provide the magnetic head H4 shown in FIG. 5.

What is claimed is:

1. A magnetic head comprising:
    a lower core layer extending from a face opposing a recording medium in a height direction;
    a pole layer on the lower core layer, the pole layer having a predetermined length in the height direction from the opposing face, a width of the pole layer at the opposing face in a width direction determining a track width;
    a back gap layer disposed on the lower core layer at a position distant from the pole layer in the height direction;
    a first insulating layer on a recess provided on the lower core layer between the pole layer and the back gap layer;
    a plurality of first coil elements provided on the first insulating layer in a space defined by the lower core layer, the pole layer, and the back gap layer,
    a coil insulator filling gaps between the plurality of first coil elements in the space, a top face of the pole layer, the top face of the coil insulator, a top faces of the first coil elements, and a top face of the back gap layer lying in a planarized plane;
    a second insulating layer disposed on the first coil elements;
    a magnetic layer formed over the planarized plane, the back gap layer being in direct or indirect contact with the magnetic layer and with the lower core layer at rear ends in the height direction,
    a third insulating layer disposed on the magnetic layer; and
    second coil elements provided on the third insulating layer,
    wherein the first coil elements and the second coil elements are electrically connected with each other at respective ends and form a toroidal coil that is wound around the magnetic layer; and, the third insulating layer is composed of an inorganic insulating sublayer and an organic insulating sublayer on the inorganic insulating sublayer.

2. The magnetic head according to claim 1, wherein the first insulating layer is continuously disposed over a rear face of the pole layer in the height direction, the recess, and a front face of the back gap layer in the height direction.

3. The magnetic head according to claim 1, wherein the pole layer comprises a lower pole sublayer and an upper pole sublayer positioned on either side of the gap sublayer.

4. The magnetic head according to claim 1, further comprising:
    a gap-depth (Gd) determining layer formed between the pole layer and the first insulating layer.

5. The magnetic head according to claim 1, wherein the first coil elements provided in the space defined by the lower core layer, the pole layer, and the back gap layer helically surround the back gap layer.

* * * * *